Oct. 11, 1960     A. H. WEINMAN     2,956,146

WATER HEATERS

Filed Feb. 18, 1959

INVENTOR.
ALFRED H. WEINMAN
BY
Gerald P. Welch
ATTORNEY

Oct. 11, 1960  A. H. WEINMAN  2,956,146
WATER HEATERS
Filed Feb. 18, 1959

INVENTOR.
ALFRED H. WEINMAN
BY
Gerald P. Welch
ATTORNEY

United States Patent Office 2,956,146
Patented Oct. 11, 1960

2,956,146

WATER HEATERS

Alfred H. Weinman, 116 Hiawatha Trail,
Highland Park, Ill.

Filed Feb. 18, 1959, Ser. No. 794,196

1 Claim. (Cl. 219—38)

This invention relates to improvements in water heaters and more particularly to a novel water heater of the type having a plurality of electrical heating units.

The present invention has for one of its objects the isolation of the heating from the storage functions of the water heater.

Another object of the invention is to permit wide-area application of heat at lower temperatures per square inch to help prevent formation of lime and scale inside the tank.

Another object of the invention is to permit the wattage of electrical heating elements to be controlled automatically in proportion to the demand for use of large or small volumes of hot water. From the electrical utility standpoint economical service depends on a high diversity of operation during peak periods; it is desirable that the fewest possible water heating units be connected to the utility's lines at any one instant during these periods. Diversity cannot be directly controlled by the utility; it is inherent in the habits of the customer and a characteristic of the individual residential control systems. Where an electrical water heater is installed with twenty-five percent to fifty percent more capacity than is likely to be needed for more than short periods of time, that extra twenty to fifty percent is energized every time the water heater thermostat calls for hot water and this adds to the utility's peak electrical load. Electricity cannot be stored until it is needed, therefore, the utility must be capable of generating the maximum amount likely to be required at any given time. There are peak periods of the day and of the year when a high percentage of the customers use electricity at the same time and quantity. When the highest of these peaks approaches, equals or exceeds the maximum generating capacity of the utility, it must either invest in new equipment to increase its capacity or avoid encouraging additional heavy uses of electricity which would add noticeably to the existing peak. New operating and distribution equipment added to serve peak loads brought about by electric water heating, would remain idle during the non-water heating period, accompanied by an excessive dollar charge for interest, taxes and depreciation of equipment. One of the objects of the present invention is to permit a high diversity of operation of electric water heaters during peak load periods on electric utility's distribution systems.

Another object of the invention is to permit fast recovery of hot water during periods when usage of large volumes of hot water is high, almost as fast as used.

Another object of the invention is to permit the electrical load demand to automatically adjust itself to the demand for the use of hot water.

Another object of the invention is to permit the quick delivery of hot water to the top of the tank where it can be used without mixture with the cooler contents of the tank.

Other and further objects of the invention will appear as the description proceeds, reference being had to the accompanying drawing, in which.

Figure 1:
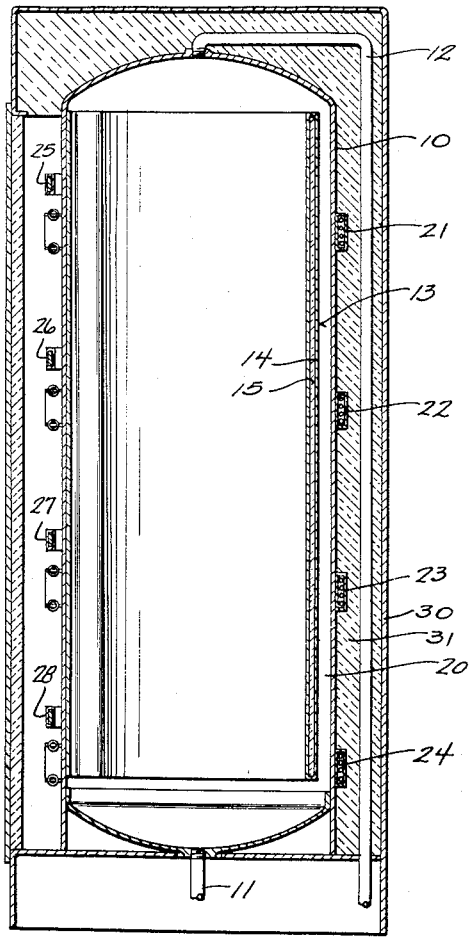
Fig. 1 is a vertical cross-sectional view of the heater.
Figure 2:
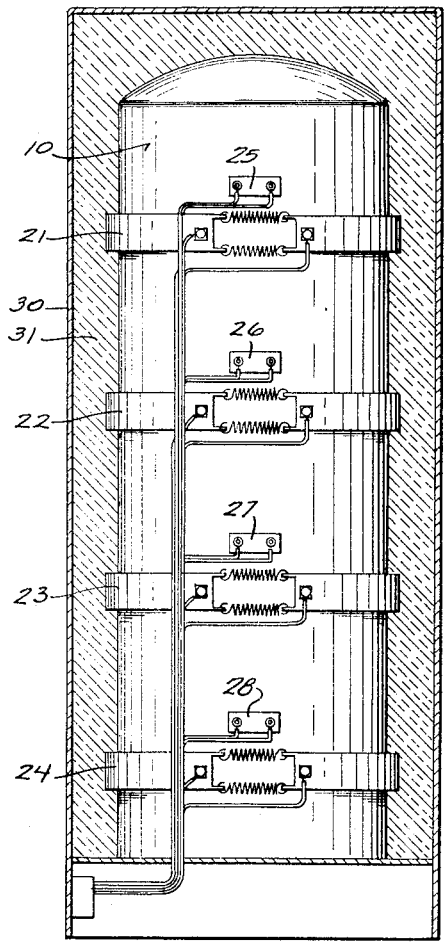
Fig. 2 is a view partly in elevation and partly in section of the same.
Figure 3:
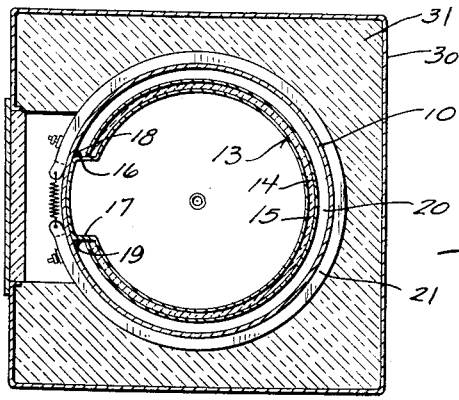
Fig. 3 is a horizontal sectional view of the same.
Figure 1:
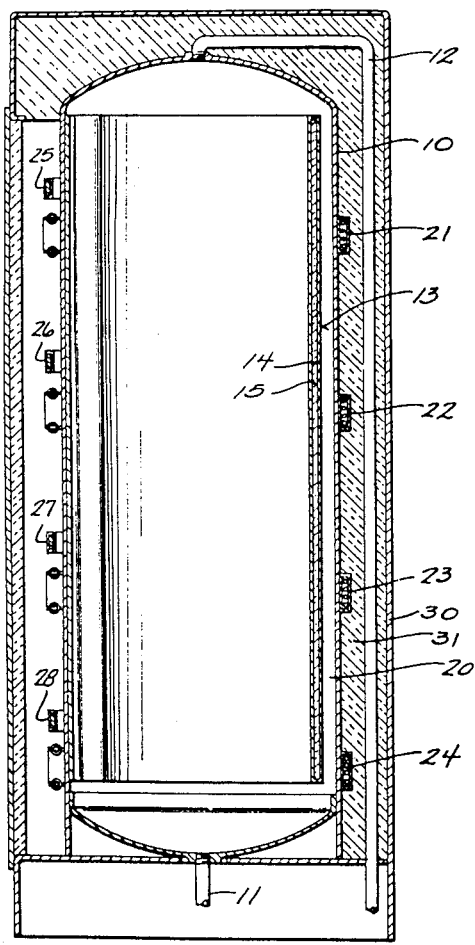
Figure 2:
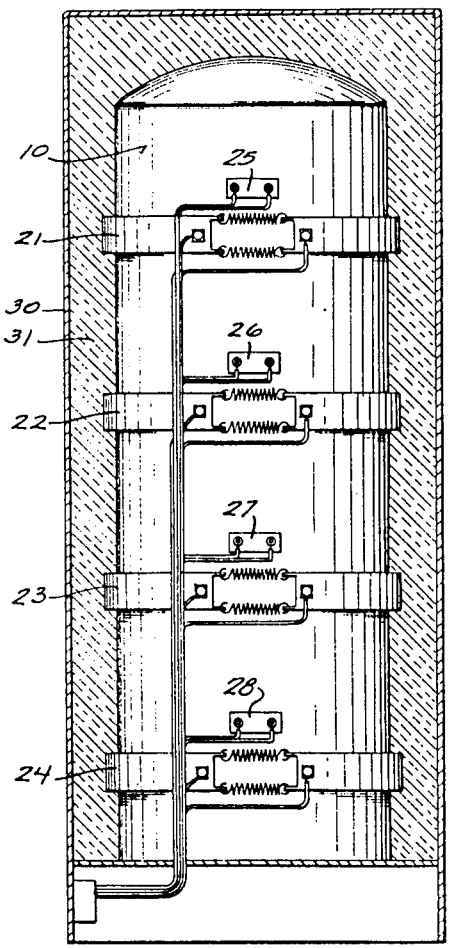
Figure 3:
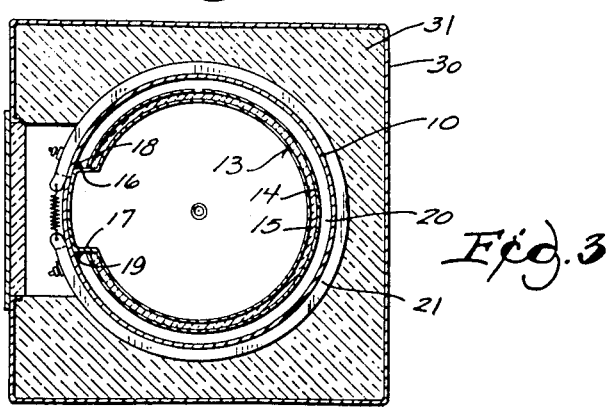

Referring more particularly to the drawings, the numeral 10 refers to a verticaly disposed cylindrical water tank, having the cold water intake pipe 11 at its lower end and the hot water discharge pipe 12 at the top. A baffle 13 has an additional outer wall 14 containing thermal insulation 15. The baffle 13 is of shorter length and smaller diameter than tank 10, is open at the top and has the channel formation having the walls 16 and 17 disposed vertically engaging with and secured by welding at points 18 and 19 to the tank 10, forming a lateral and vertical crescent shaped isolation chamber 20.

Four periphery electric heaters, 21, 22, 23 and 24 are in contact with the outer circumference of the tank 10, and by heat conduction with the isolation space 20 and have the related thermostatic controls 25, 26, 27 and 28.

In use, the crescent shaped column of water in the chamber 20 is heated by one or all of the heaters 21, 22, 23 and 24 and passes upwardly into the top of the tank 10, resulting in a desired volume of hot water immediately available for use by withdrawal through the said discharge pipe 12, and/or storage within the baffle 13 in stratification from top to bottom of the tank where it can be used without mixture with the cooler bottom contents of the tank.

An outer cabinet 30 houses the tank 10 and baffle 13 and contains a thermal insulation agent 31.

It will be understood that the device is capable of many modifications in structure and design, without departing from the spirit of the invention, within the scope of the appended claim.

Having thus described the invention, what is claimed and desired to be secured by Letters Patent of the United States, is:

An electric water heater comprising a vertical cylindrical tank, a vertical cylindrical double walled thermally insulated baffle disposed concentrically within the tank, a channel formation disposed longitudinally in said baffle with the arcuate base portion of said channel formation affixed against the inside of said tank to define a reverse C form isolation chamber in cross-section between said baffle and said tank, a plurality of circumference water heaters disposed exteriorly and vertically spaced on said tank, and thermostatic controls associated therewith.

References Cited in the file of this patent

UNITED STATES PATENTS

| | | |
|---|---|---|
| 1,837,597 | Thomas | Dec. 22, 1931 |
| 1,886,135 | Tannehill | Nov. 1, 1932 |
| 1,982,213 | Hopkins | Nov. 27, 1934 |
| 2,576,603 | Hines et al. | Nov. 27, 1951 |
| 2,754,406 | Browne | July 10, 1956 |
| 2,804,534 | Coates | Aug. 27, 1957 |
| 2,834,865 | Coates | May 13, 1958 |